April 14, 1959 W. E. OAKES 2,881,798
SUPPLY MAINTENANCE DEVICE FOR ENGINES
Filed Sept. 28, 1956
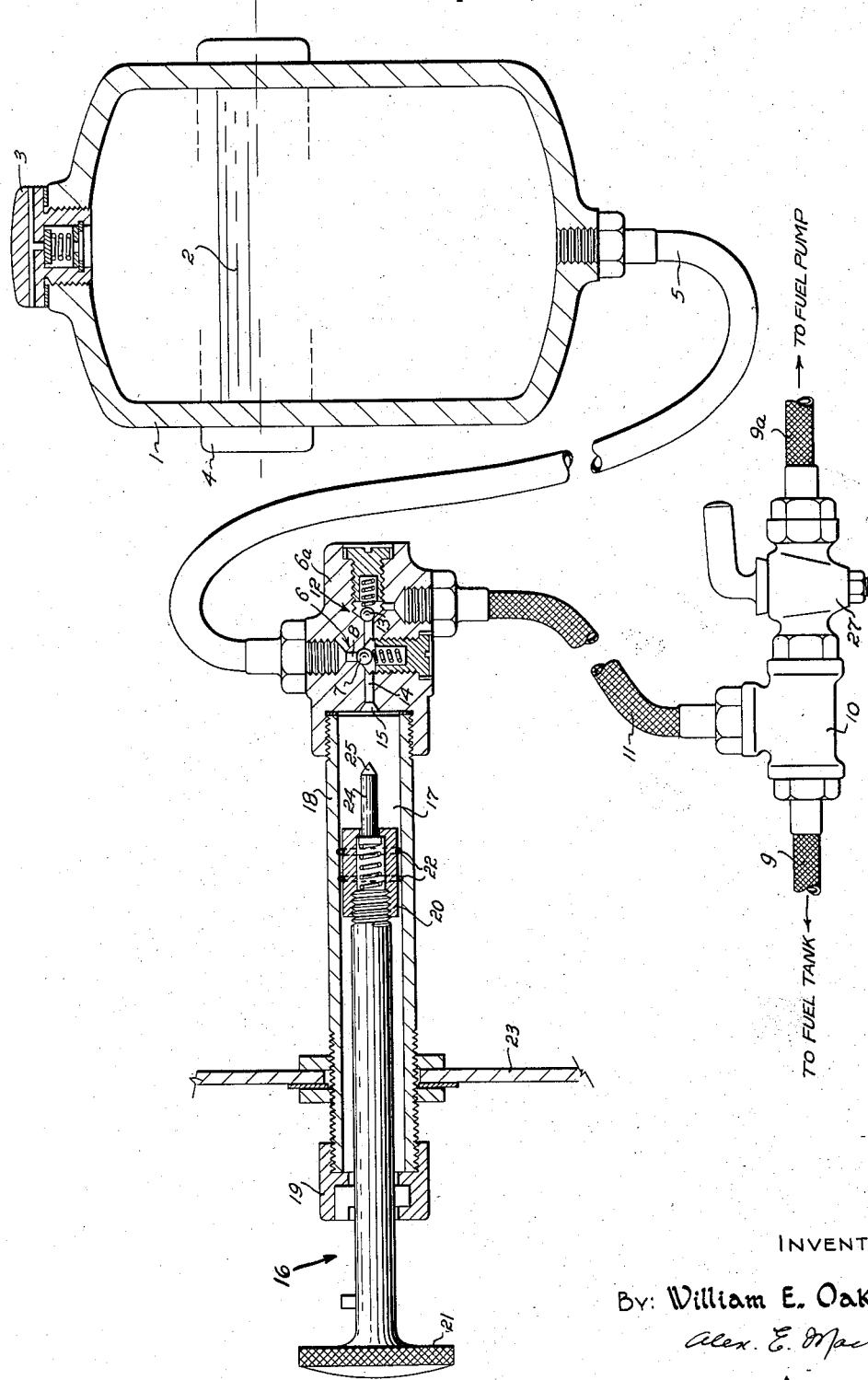
INVENTOR:
By: William E. Oakes
Alex. E. MacRae
ATTORNEY

United States Patent Office 2,881,798
Patented Apr. 14, 1959

2,881,798

SUPPLY MAINTENANCE DEVICE FOR ENGINES

William E. Oakes, Edmonton, Alberta, Canada

Application September 28, 1956, Serial No. 612,867

1 Claim. (Cl. 137—565)

This invention relates to a fuel supply maintenance device for engines.

Fuel lines of engines such as internal combustion engines frequently fail to deliver the required amount of fuel by reason of pump failure or the presence of foreign material therein.

In areas where freezing temperatures occur, operation of internal combustion engines, such as in motor vehicles, is frequently subject to interruption because of the formation of ice in the fuel system of the engine. The problem of preventing such icing is particularly acute in northern and remote areas where a stalled engine might well prove fatal in severe temperatures.

It is an object of this invention to provide an easily operated apparatus for maintaining delivery of a supply of fuel through the fuel line of an engine should the normal supply of fuel fail by reason of the presence of foreign material in the fuel supply or of the failure of the fuel pump.

A more particular object is to provide an easily operated system for injecting de-icing fluid into the fuel line, fuel pump and carburetor of engines.

The invention resides in the provision of a manually operable pump for forcing fluid into the fuel system of an engine and a valve system, responsive to the action of such pump, for allowing flow of the fluid into the fuel supply system of the engine.

One embodiment of the invention will be described with reference to the accompanying drawing which is a sectional elevation view of an embodiment of the invention.

Container 1 contains a supply of alcohol 2 or other commercial de-icing fluid. It has a pressure valve cap 3 for maintaining at least a minimum pressure within the container and is mounted conveniently on or near the engine as by clamp 4, a conduit or hose 5 connects the bottom of container 1 with a first ball valve 6 in a valve housing 6a and in which a first ball 7 is normally spring urged into sealing contact with a first valve fluid passage 8 with which hose 5 is connected. A T joint 10 is mounted in the fuel line, which thus has a branch 9 leading from the joint 10 to the fuel tank and a branch 9a leading from the joint to the fuel pump. Preferably, the joint 10 is located closely adjacent the fuel pump. A conduit or hose 11 connects the T joint 10 with a second ball valve 12 in housing 6a and which has a second ball 13 normally spring urged into sealing contact with a second or main valve fluid passage 14. The second valve fluid passage 14 communicates with the first passage through the first ball valve 6 and opens through an enlarged frustro-conical end portion 15 into the chamber 17 of a cylinder 18 of a pump 16.

The cylinder 18 has a closure cap 19, a piston 20 mounted in said cap 19 and having a handle 21 on the end thereof outside the cylinder chamber 17, and a pair of piston rings 22 for sealing the piston in the cylinder. The cylinder 18 is preferably mounted on a member which may conveniently comprise a dashboard 23 or a like instrument panel associated with the engine. The piston 20 preferably carries on the end thereof, within the cylinder chamber 17, a spring mounted rod 24 having a conical end 25 which will fit into the frustro-conical end 15 of the second valve fluid passage.

A simple manually operable valve 27 is mounted in the fuel line branch 9a and preferably adjoining the T joint. This valve is open in normal position since icing of the fuel supply system generally occurs first in the fuel line near or in the fuel pump or carburetor.

In operation as the piston 20 is pulled out in its suction stroke, the pressure in the cylinder chamber 17 decreases, thus assisting the sealing action of the second ball 13 and permitting the pressure in hose 5 to depress the first ball 7 against the action of its spring. The alcohol 2 then flows out of chamber 1, through the hose 5 and first valve fluid passage 8 into second valve fluid passage 14 and into cylinder chamber 17. When the piston is pushed in, in its pressure stroke, the first ball 7 is forced into sealing relation with the first valve fluid passage 8 and the second ball 13 is forced out of sealing engagement with the second valve fluid passage 14 against the action of the spring. The alcohol 2 then is forced out of the cylinder chamber 17, through passage 14 and hose 11 into T joint 10 and into the fuel in the fuel line. Since the fluid enters the line in proximity to the fuel pump and carburetor, where icing normally occurs, it will first enter this portion of the system and de-ice the same. It will also enter the fuel line branch 9 to a minor extent. However, if this action fails to de-ice the fuel system then valve 27 may be closed and the fluid injected entirely through the fuel line branch 9. This localized injection of the fluid will serve to de-ice this extended portion of the fuel line.

The device may be readily employed for the removal of foreign material other than ice from the fuel line by closing valve 27 and operating the pump until sufficient pressure is developed to move the foreign material back through line 9 to the fuel tank.

I claim:

In combination with an engine fuel supply line, a device for use in de-icing said line which comprises a container for de-icing fluid, a T joint in said fuel line, said fuel line having a first branch leading from said T joint in one direction to a fuel tank and a second branch leading from said T joint in the opposite direction to a fuel pump, a conduit leading from said container to said T joint, a manually operable valve adjoining said T joint in said fuel line branch leading to said fuel pump to selectively place said conduit in communication with either both said branches or solely with said first branch of said fuel line, and a manually operable pump in said conduit for pumping fluid from said container to both branches of or said first branch of said fuel line in accordance with the setting of said valve.

References Cited in the file of this patent

UNITED STATES PATENTS

| | | |
|---|---|---|
| 1,276,890 | Fay | Aug. 27, 1918 |
| 1,305,416 | Taylor | June 3, 1919 |
| 1,517,665 | Chase | Dec. 2, 1924 |
| 2,001,164 | Swan et al. | May 14, 1935 |
| 2,308,656 | Harth | Jan. 19, 1943 |
| 2,366,830 | Cannon | Jan. 9, 1945 |